(12) United States Patent
  Dhanda

(10) Patent No.: US 9,020,121 B1
(45) Date of Patent: Apr. 28, 2015

(54) METHOD AND APPARATUS FOR SHARING DATA BETWEEN DEVICES

(75) Inventor: Sanjeev Dhanda, San Francisco, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 13/550,257

(22) Filed: Jul. 16, 2012

(51) Int. Cl.
  *H04M 3/42* (2006.01)

(52) U.S. Cl.
  CPC ........................................ *H04M 3/42* (2013.01)

(58) Field of Classification Search
  CPC ........................................................ H04M 3/42
  USPC ..................... 348/14.08, 14.09; 379/191, 196, 379/265.07, 207.13, 93.03, 127.06, 266.04, 379/142.06, 266.01
  See application file for complete search history.

(56) References Cited

U.S. PATENT DOCUMENTS

| | | | |
|---|---|---|---|
| 7,026,926 B1* | 4/2006 | Walker, III | 340/539.11 |
| 7,725,540 B2* | 5/2010 | Roberts et al. | 709/205 |
| 2003/0027591 A1* | 2/2003 | Wall | 455/556 |
| 2003/0147514 A1 | 8/2003 | Ryu et al. | |
| 2006/0168074 A1* | 7/2006 | Gardner et al. | 709/206 |
| 2007/0197203 A1 | 8/2007 | Hu | |
| 2008/0247525 A1 | 10/2008 | LeBlanc et al. | |
| 2011/0081900 A1 | 4/2011 | Manne et al. | |
| 2011/0086593 A1 | 4/2011 | Hardacker | |
| 2012/0042066 A1* | 2/2012 | Chatterjee et al. | 709/224 |

OTHER PUBLICATIONS

Bump Technologies, "Frequently Asked Questions," available at "http://web.archive.org/web/20110518183929/http://bu.mp/faq", dated May 18, 2011 (retrieved on Aug. 7, 2012).

* cited by examiner

*Primary Examiner* — Yosef K Laekemariam
(74) *Attorney, Agent, or Firm* — Leydig, Voit & Mayer, Ltd.

(57) ABSTRACT

A method, apparatus, and system are provided for sharing data between devices. As an example, a method for exchanging information between a phone and at least one other device includes: obtaining from a remote server a unique identifier that uniquely identifies the phone; establishing a session ID (identifier) between the phone and the other device via first communication channel; and communicating data from the phone to the remote server via a second communication channel along with the session ID, wherein the other device is configured to access the data from the remote server using the session ID.

12 Claims, 9 Drawing Sheets

METHOD AND APPARATUS FOR SHARING DATA BETWEEN DEVICES

BACKGROUND

The primary objective of a telephony connection is to communicate information. The information may be a simple "Hello" or may be more detailed information. For example, when a user calls a customer service call center, the user may be asked to provide various pieces of information in order to authenticate their identity with the customer service call center. Examples of such information may include name, security code, account number, date of birth, etc.

One problem with traditional telephony connections, especially in the context of customer service call centers, is that oftentimes when a call is transferred from one agent to the next, the caller needs to provide the authenticating information again to the next agent. This process is inefficient and can be become annoying to the caller when the caller must repeatedly provide the authenticating information.

Another problem with traditional telephony connections, also in the context of customer service call centers, is that users are often placed on hold for long periods of time. The user typically does not know how many other users are in front of the user in the queue and does not know the approximate wait time. This unknown adds to the frustration of being placed on hold. Some customer service call centers provide an automated message that informs the user of his or her position in the queue and the approximate wait time. Although this bit of information may mitigate the frustration and irritation of being placed on hold, it does not solve the problem of waiting in a queue to achieve the ultimate goal of the call.

To overcome some of these drawbacks, the customer service call center may provide a "call back" feature where the user provides a phone number to the customer service call center and then hangs up. The user's position in the queue is tracked and the customer service call center places an outgoing call to the user when the user's position in the queue comes up. However, the call back feature is wrought with security concerns. It is relatively simple for a malicious party to spoof the phone number of the customer service call center and call the user representing itself as the customer service call center. The malicious party could then obtain sensitive information from the user for illegal purposes, e.g., to steal the user's money. For this reason, users prefer to place outgoing calls to trusted phone numbers rather than accepting or trusting incoming calls from potentially malicious parties.

Thus, such conventional systems are subject to failure making them unreliable and undesirable. Accordingly, there remains a need in the art for a method and apparatus for a secure and efficient way to share information over a phone call connection.

SUMMARY

One embodiment provides a method for exchanging information between endpoints of a telephony connection. The method includes obtaining from a remote server a unique identifier that uniquely identifies a first endpoint; communicating to the remote server user information associated with the first endpoint, wherein the user information is associated with the unique identifier; establishing a session ID between the endpoints via the telephony connection, wherein the telephony connection is established between the first endpoint and a customer service call center; communicating the session ID to the remote server via a communications connection separate from the telephony connection, wherein the user information is communicated from the remote server to a first agent of the customer service call center based on a first agent device providing the session ID to the remote server, and wherein, after the telephony connection is transferred from the first agent to a second agent, the user information is communicated from the remote server to the second agent based on a second agent device providing the session ID to the remote server.

Other embodiments provide and apparatus for exchanging information between endpoints of a telephony connection. The apparatus comprising a first communications module and a second communications module. The first communications module is configured to obtain from a remote server a unique identifier that uniquely identifies the apparatus, where the apparatus comprises a first endpoint, and communicate information to the remote server, wherein the information is associated with the unique identifier. The second communications module is configured to establish a session ID at the endpoints of the telephony connection, where the first communications module communicates the session ID to the remote server via a communications connection separate from the telephony connection, and where the information is communicated from the remote server to a second endpoint based on the second endpoint providing the session ID to the remote server.

Another embodiment provides a system for exchanging information between devices. The system comprises a server coupled to a data network, a first device, and a second device. The first device is configured to: obtain a unique identifier corresponding to the first device from the server, establish a session ID between the first device and a second device using an audio connection, and transmit data to the server via a data connection, wherein the server associates the data with the session ID. The second device configured to: obtain a unique identifier corresponding to the second device from the server, wherein the session ID associates the unique identifier corresponding to the first device and the unique identifier corresponding to the second device, and access the data from the server via the data network based on the session ID.

DETAILED DESCRIPTION

Figure 1:
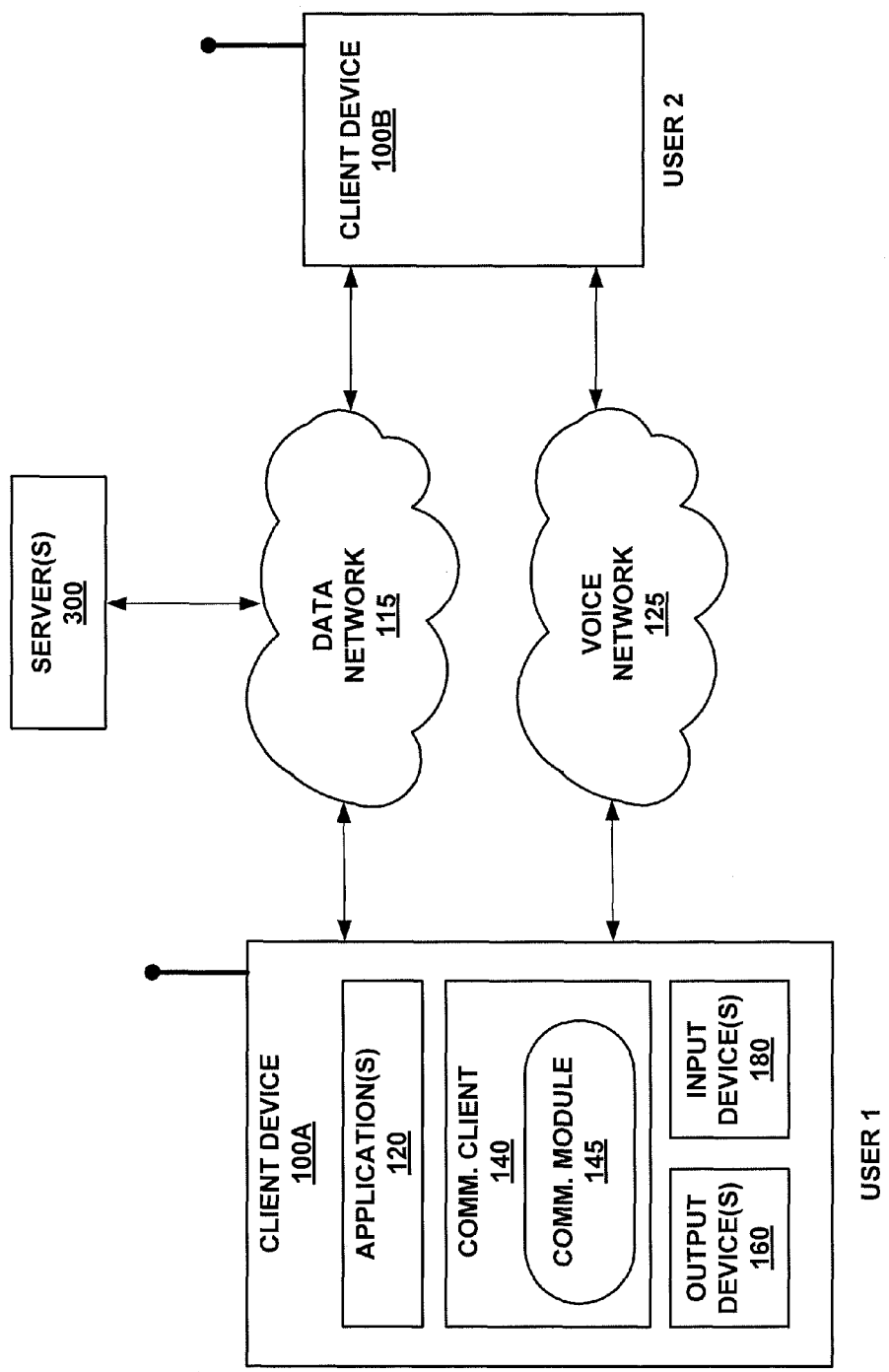
FIG. 1 is a block diagram of an example communication environment, according to one embodiment.

In an example embodiment enabling the secure transmission and reception of information using a mobile phone, a user registers the mobile phone and phone number with a trusted server. The trusted server assigns the mobile phone a unique identifier (ID) associated with the phone. Another party, such as a customer service call center, also registers with the trusted server and receives a unique ID associated with the other party. The security features of this example embodiment enable a user call to be ended and securely returned instead of maintaining the user connection in a queue while other user connections are being serviced.

When the user calls the other party using his or her phone, a session ID is generated between the phone and the other party. In one embodiment, a handshake protocol establishes the session ID. For example, a handshake similar to the SSL (Secure Socket Layer) protocol may be used. The handshake may occur over a low-bandwidth connection, such as the phone call itself. In one example, the handshake messages are sent as inaudible tones over the voice channel of the phone call.

Once the user's mobile phone and the other party are each aware of the session ID, information is communicated between the mobile phone and the other party via the trusted server. For example, information is transmitted from the phone to the server, where the information is stored along with the session ID. In one embodiment, the information is transmitted to the server along a high-bandwidth connection, such as the Internet. The other party then retrieves the information from the server based on knowing the session ID via a second high-bandwidth connection. The information is retrieved from the server in either a "push" or "pull" manner in keeping with well known techniques.

In another example, information is transmitted from the other party to the server, where the information is stored along with the session ID. The mobile phone can then retrieve the information from the server based on knowing the session ID. In this manner, information can be securely communicated between the phone and the other party via the trusted server. The phone and the other party do not necessarily trust one another, but they both trust the server, which allows the transaction to be secure.

One example use of the secure connection is within the context of a user calling a customer service call center. Relevant user information (e.g., name, account number, credit card number, etc.) can be stored by the user/mobile phone onto the server. The customer service call center then accesses this information from the server without the user having to repeatedly provide the information to the customer service call center during the call, e.g., as the call is transferred between customer service agents. Also, in another example, the customer service call center provides games to the user while the user is on hold. The customer service call center can transmit the game data to the server and the user's device can access the game data via the server. In another example, the game data is stored on a third-party server and the customer service call center provides pointers to the game data, via the server, that are stored on the third-party server.

Another example use of the secure connection is a point-of-sale terminal. The user establishes a session with the terminal at checkout—e.g., via NFC (near field communication) or other protocol. The user device (and/or the user's registered credit card) and the POS terminal are communicatively coupled to the server and exchange information via the server. For example, the user provides payment information to the server and the terminal accesses the payment information on the server. Similarly, the server provides a sales receipt to the server that the user then retrieves from the server. Uploading the receipt by the POS terminal and accessing the receipt by the user both occur at a time after the transaction is complete—e.g., later that night or the next day.

Figure 2:
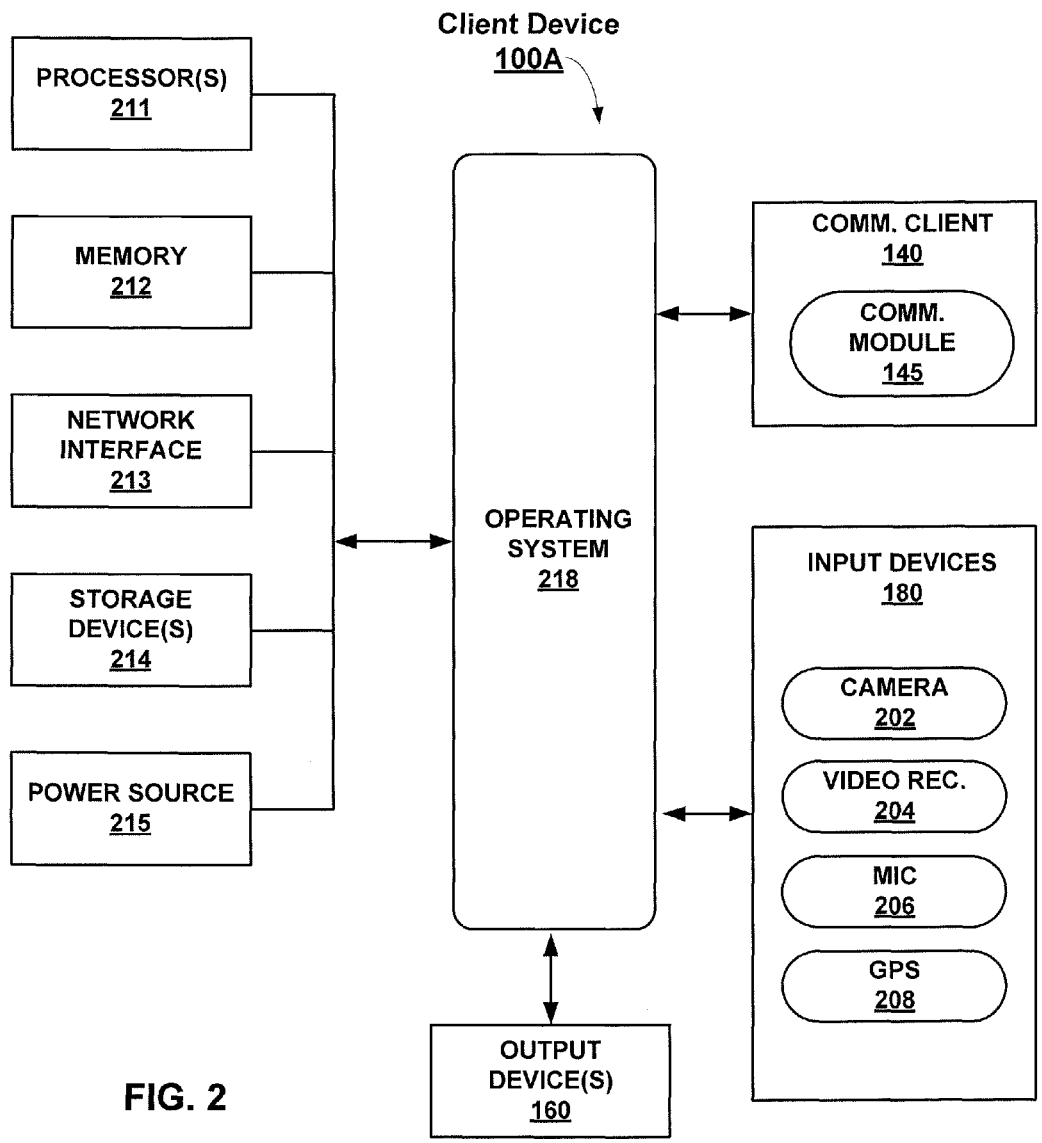
FIG. 2 is a block diagram of example functional components for one of the client devices in FIG. 1, according to one embodiment.

Turning to the drawings and referring to FIGS. 1 and 2, an example communication environment is presented as an example environment for the security features described herein and does not imply any limitation regarding the use of other communication environments. In FIG. 1, the communication environment includes client devices 100A, 100B, a data network 115, a voice network 125, and server(s) 300. Each of the client devices 100A, 100B is in communication with the data network 115 and the voice network 125. Server(s) 300 are also in communication with the data network 115.

Examples of client devices 100A, 100B include, but are not limited to, portable, mobile, and/or stationary devices such as landline telephones, mobile telephones (including mobile phones with advance computing capabilities, or "smartphones"), laptop computers, tablet computers, desktop computers, personal digital assistants (PDAs), portable gaming devices, portable media players, e-book readers, Internet-enabled televisions, or Internet-enabled appliances, among others. In some embodiments, two or more client devices 100A, 100B comprise the same type of device. For example, client devices 100A and 100B may both be mobile phones. In other embodiments, the two or more client devices are different types of devices. For example, client device 100A may be a mobile phone and client device 100B may be a telephone or computing device associated with a customer service call center.

In the embodiment illustrated by FIG. 1, the client devices 100A, 100B communicate with a server(s) 300 via data network 115. The data network 115 may comprise any type of network for communicating data, including a LAN (local area network), WAN (wide area network), cellular data network, VPN (virtual private network), enterprise network, or any other type of network that allows sharing of information and/or resources. The voice network 125 may be any type of network for voice communication, including a cellular phone network, a POTS (Plain Old Telephone Service) network, a conference call network, among others.

The server(s) 300 may comprise multiple physical servers. According to various embodiments, each server can equivalently be a physically separate machine or can be different processes running within the same physical machine.

The client device 100A of FIG. 1 includes application(s) 120, communications client 140, output devices 160 (e.g., a display), and input devices 180 (e.g., keyboard, mouse, touch screen, video recording device, audio recording device, GPS (global positioning module), photo capture device, etc.). In some embodiments, a device may act as both an output device and an input device. An example of application(s) 120 is a web browser application or a smartphone application (or "app"). Application(s) 120 provide the client device 100A with a variety of functionalities. Examples include social media functionality, web browsing capabilities, calendars, contact information, games, document processing, photo editing, document sharing, among others. Application(s) 120 employ the output devices 160 to display information at a graphical user interface (GUI).

The communications client 140 includes a communications module 145 that enables output devices 160 to display information at the GUI. The communications module 145 also enables the communications client 140 to connect to the server(s) 300. Typically, the communications module 145 is a network module that connects the client device 100A to the data network 115 (e.g., Internet) and/or voice network 125 (e.g., cellular phone network) using one of a variety of available network protocols. The GUI is configured to display data (such as, for example, audio and video data) received from the server(s) 300 via the data network 115 and/or received over the voice network 125.

In some embodiments, client device 100B includes similar elements and functions as client device 100A. In other embodiments, client device 100B includes different, fewer, or more elements and functions as client device 100A.

Some embodiments provide for a first user, using client device 100A, to register with the server(s) 300 and obtain a unique ID (identifier) associated with the client device 100A. Similarly, client device 100B registers with the server(s) 300 and obtains a unique ID associated with the client device 100B. The client devices 100A, 100B establishes a phone connection between one another over the voice network 125. In one example, the client device 100A is operated by a user and client device 100B is associated with a customer service call center. A phone connection is established when the user operating client device 100A calls the customer service call center.

After the phone connection is established, the client devices 100A, 100B communicates with one another to establish a session ID for the phone connection. In one embodiment, the session ID is established between the client devices 100A, 100B by sending messages between the devices over the voice network 125. For example, inaudible tones are communicated between the devices over the voice network 125 to establish the session ID, as described in greater detail below.

Once the client devices 100A, 100B are each aware of the session ID, information in the form of machine-readable data can be communicated between the client devices 100A, 100B via the data network 115 and server(s) 300. For example, data is transmitted from the client device 100A to the server(s) 300 via the data network, where the data is stored along with the session ID. The client device 100B then retrieves the data from the server(s) 300 via the data network 115 based on knowing the session ID. The data is retrieved from the server(s) 300 in either a conventional "push" or "pull" manner. Therefore, in some embodiments, data can be securely communicated between the client devices 100A, 100B via the trusted server.

In one embodiment, the server to which the data is uploaded from client device 100A is the same physical server from which the client device 100B accesses the content. In other embodiments, the server to which client device 100A uploads the content is different from the server from which client devices 100B or 100C access the content, though they may be considered one virtual server. As an example, the different physical servers operate by separate mobile phone service providers, though they may act as a single virtual server.

Referring now to FIG. 2, one particular example of client device 100A is illustrated. Many other embodiments of the client device 100A may be used. In the illustrated embodiment of FIG. 2, the client device 100A includes one or more processor(s) 211, memory 212, a network interface 213, one or more storage devices 214, a power source 215, output device(s) 160, and input device(s) 180. The client device 100A also includes an operating system 218 and a communications client 140 that are executable by the client. Each of components 211, 212, 213, 214, 215, 160, 180, 218, and 140 is interconnected physically, communicatively, and/or operatively for inter-component communications in any operative manner.

As illustrated, processor(s) 211 are configured to implement functionality and/or process instructions for execution within client device 100A. For example, processor(s) 211 execute instructions stored in memory 212 or instructions stored on storage devices 214. Memory 212, which may be a non-transient, computer-readable storage medium, is configured to store information within client device 100A during operation. In some embodiments, memory 212 includes a temporary memory, area for information not to be maintained when the client device 100A is turned OFF. Examples of such temporary memory include volatile memories such as random access memories (RAM), dynamic random access memories (DRAM), and static random access memories (SRAM). Memory 212 maintains program instructions for execution by the processor(s) 211.

Storage devices 214 also include one or more non-transient computer-readable storage media. Storage devices 214 are generally configured to store larger amounts of information than memory 212. Storage devices 214 may further be configured for long-term storage of information. In some examples, storage devices 214 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The client device 100A uses network interface 213 to communicate with external devices via one or more networks, such data network 115 and/or voice network 125. Network interface 213 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the client device 100A uses network interface 213 to wirelessly communicate with an external device such as the server(s) 300 of FIG. 1, a mobile phone, or other networked computing device.

The client device 100A includes one or more input devices 180. Input devices 180 are configured to receive input from a user through tactile, audio, video, or other sensing feedback. Non-limiting examples of input device 180 include a presence-sensitive screen, a mouse, a keyboard, a voice responsive system, camera 202, a video recorder 204, a microphone 206, a GPS module 208, or any other type of device for detecting a command from a user or sensing the environment. In some examples, a presence-sensitive screen includes a touch-sensitive screen.

One or more output devices 160 are also included in client device 100A. Output devices 160 are configured to provide output to a user using tactile, audio, and/or video stimuli. Output devices 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user. In some embodiments, a device may act as both an input device and an output device.

The client device 100A includes one or more power sources 215 to provide power to the client device 100A.

Non-limiting examples of power source 215 include single-use power sources, rechargeable power sources, and/or power sources developed from nickel-cadmium, lithium-ion, or other suitable material.

The client device 100A includes an operating system 218, such as the Android® operating system. The operating system 218 controls operations of the components of the client device 100A. For example, the operating system 218 facilitates the interaction of communications client 140 with processors 211, memory 212, network interface 213, storage device(s) 214, input device 180, output device 160, and power source 215.

As also illustrated in FIG. 2, the client device 100A includes communications client 140. Communications client 140 includes communications module 145. Each of communications client 140 and communications module 145 includes program instructions and/or data that are executable by the client device 100A. For example, in one embodiment, communications module 145 includes instructions causing the communications client 140 executing on the client device 100A to perform one or more of the operations and actions described in the present disclosure. In some embodiments, communications client 140 and/or communications module 145 form a part of operating system 218 executing on the client device 100A.

Figure 3:
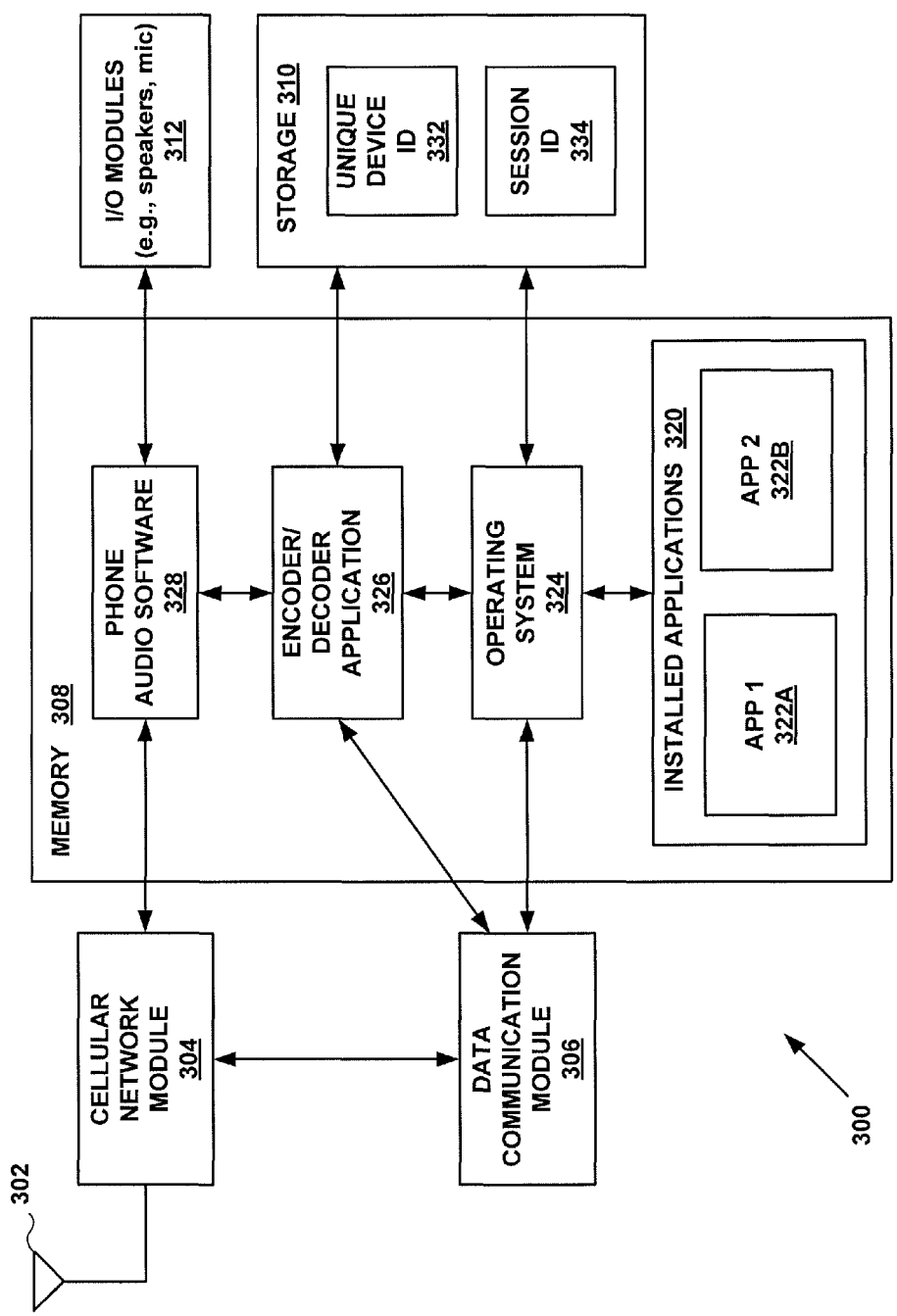
FIG. 3 is a schematic diagram of the arrangement of applications on a client device configured to communicate data with another client device, according to one embodiment.

FIG. 3 is a conceptual diagram of the arrangement of applications on a client device configured to communicate data with another client device, according to one embodiment. As shown, a client device 300 includes an antenna 302, a cellular network module 304, a data communication module 306, a memory 308, a storage device 310, and I/O (input/output) modules 312. The memory 308 includes various applications that are executed by a processor (not shown), including installed applications 320, an operating system 324, an encoder/decoder application 326, and phone audio software 328. For example, installed applications 320 may be downloaded and installed from an applications store, and may include applications 322A, 322B.

The storage device 310 includes non-volatile storage where digital content and information can be stored on the client device 300. In one embodiment, the storage device 310 may store a unique device ID 332 associated with the client device 300 and/or a session ID 334 corresponding to a communication session between the client device 300 and another device. In some embodiments, the unique device ID 332 and/or the session ID 334 are stored in the memory 308.

The operating system 324 is configured to communicate with a remote server via the data communications module 306 to obtain a unique device ID 332 for the client device 300. In one embodiment, the remote server acts as a certificate authority and the client device 300 is configured to establish a trust relationship with the certificate authority.

The client device 300 is manipulated by a user to initiate a telephony connection between the client device and another device. In one embodiment, the connection is initiated by the user dialing the phone number manually or selecting the phone number from a contact list in a conventional manner. In other embodiments, the connection is initiated through one of the installed applications 320 after the user has been authenticated with the installed application. In yet another embodiment, the connection is initiated after the user selects an advertisement presented to the user on a display device of the client device 300 (i.e., a "click-to-call" ad).

After the telephony connection is established, the client device 300 enters into a communication session with the other device. A unique session ID 334 is associated with the communication session. As described in greater detail below, in one example the session ID 334 is established between the client device 300 and the other device by implementing a handshake protocol. In one embodiment, the handshake protocol is performed by the client device 300 and the other device by way of exchanging tones over the voice channel of the telephony connection. For example, the encoder/decoder application 326 is configured to encode and decode the messages corresponding to the handshake protocol into a series of tones and transmit the tones over the audio channel of the telephone call via the phone audio software application 328 and the cellular network module 304.

In some embodiments, the encoder/decoder application 326 is configured to encode data into audio signals and/or decode audio signals into data. In one embodiment, the frequency of the encoded audio signal is above or below the range of human hearing. In other embodiments, the encoded audio signal is human recognizable, much like a fax machine or acoustic modem. Also, in some embodiments, a predefined start-of-message code is precedes the encoded audio signal and/or a predefined end-of-message code is appended after the encoded audio signal. Any tone generation method can be used to encode the data into an audio signal. One example includes dual-tone multi-frequency (DTMF) signaling used for signaling over analog telephone lines.

The encoded audio signal with preceding and/or appended start/end codes is communicated from the encoder/decoder application 326 to the phone audio software 328 that inserts the audio signal and/or codes into the audio stream of the voice conservation. The phone audio software 328 may comprise firmware for facilitating a phone conversion between two users. The phone audio software 328 may also be associated with an API (application programming interface) that allows additional audio information to be inserted into the phone conversation. In one embodiment, the API inserts the encoded audio signal into the phone conversation between the two users. In other embodiments, any other technologically feasible process is implemented to insert the audio of the encoded audio signal into the phone conversation. In some embodiments, the encoded signal and/or codes is repeated one or more times so that the receiver device can properly receive the message.

As shown in the embodiment in FIG. 3, each of the installed applications 320, the operating system 324, the encoder/decoder application 326, and the phone audio software 328 are shown as separate software applications. In other embodiments, the functionality of the installed applications 320, the operating system 324, the encoder/decoder application 326, and the phone audio software 328 can be combined into a single software application (e.g., mobile phone "app"). In still further embodiments, the functionality of the installed applications 320, the encoder/decoder application 326, and the phone audio software 328 may be included in the operating system 324 of the client device 300.

In some embodiments, the same, similar, different, fewer, or more components shown in FIG. 3 may be included in the other client device with which the client device 300 communicates.

Figure 4:
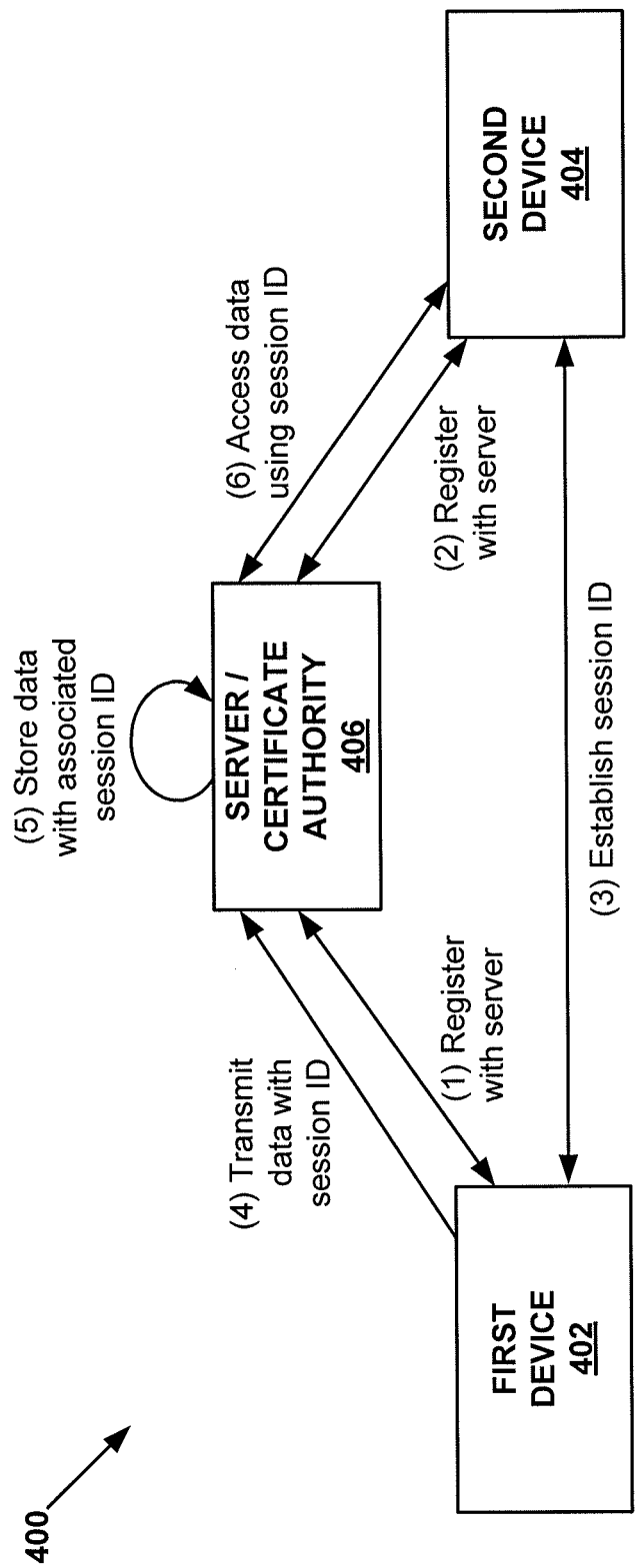
FIG. 4 is a schematic diagram of the arrangement of client device configured to receive an audio signal associated with digital content, according to one embodiment.

FIG. 4 is a conceptual diagram of a system 400 for communicating data between two devices, according to one embodiment. As shown, the system 400 includes a first device 402, a second device 404, and a server 406. In one example, the first device 402 is a user device, the second device 404 is a device associated with a customer service call center, and the server 406 comprises a certificate authority.

As shown in FIG. 4, at stage 1, the first device 402 registers with the server 406. At stage 2, the second device 404 registers with the server 406. In one embodiment, stage 1 is performed before stage 2. In another embodiment, stage 2 is performed before stage 1. In yet another embodiment, stages 1 and 2 are performed simultaneously. One example of a method for the first device 402 and the second device 404 to register with server 406 is described below in FIG. 5.

Referring still to FIG. 4, at stage 3, the first device 402 and the second device 404 establish a session ID. In one embodiment, the session ID is established by the first device 402 and the second device 404 performing a handshake protocol over a first communication channel, such as the audio channel of a telephony connection. An example of the handshake protocol is described below in FIG. 6.

After the session ID has been established, at stage 4, the first device 402 transmits data to the server 406 along with the session ID over a second communication channel, such as the Internet. In some embodiments, the first device 402 also transmits the unique ID associated with the first device 402 to the server 406 as a form of authenticating the first device 402. At stage 5, the server 406 stores the data received from the first device 402 with the associated session ID. In one embodiment, the server 406 itself is configured to store the data and the associated session ID. In other embodiments, the server 406 communicates the data to another server (not shown) that stores the data and the session ID. At stage 6, the second device accesses the data from the server 406 using the session ID. The data is accessed by the second device using either a conventional "push" or "pull" technique. In a push technique, the server 406 pushes the data to the second device 404 whenever new data is available. In a pull technique, the second device 404 periodically polls the server 406 for new data.

Additionally, in some embodiments and as an added security layer, before the second device 404 is able to retrieve the data, the first device receives a data access request from the server 406. The first device 402 then confirms that the second device 404 should be allowed to access the data, such as by providing a password.

Additionally, in some embodiments, the second device 404 can access the data (i.e., at stage 6) after the communication session between the first device 402 and the second device 404 has been discontinued. For example, assume that the first device 402 is a point-of-sale terminal and the second device is a user's mobile phone or registered credit card. A session ID is established between the terminal and the phone/card at the point-of-sale. In one example, for a credit card transaction, the session ID may be a transaction ID of the credit card transaction. Once the payment transaction is finished, the goods/services are paid for by the user. Later that night, or during low traffic, the POS terminal transmits a full receipt for the transaction IDs completed that day to the server 406. The next day, the user logs in via a web interface and authenticates with the server, from which the user can obtain the full receipt data uploaded by the POS terminal.

One example of the method for performing stages 4-6 in FIG. 4 is described below in FIG. 7.

Figure 5:
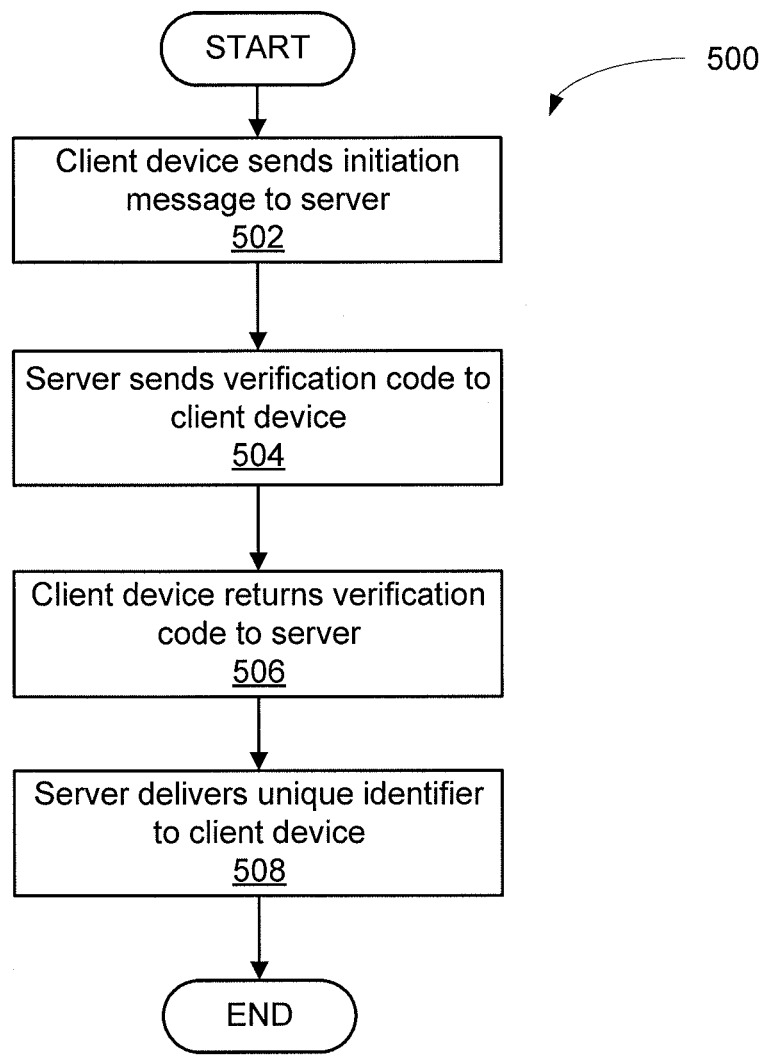
FIG. 5 is a flowchart illustrating registering a client device with a server, according to one embodiment.

FIG. 5 is a flowchart illustrating registering a client device with a server, according to one embodiment. As shown, at stage 502, a software application executing on a client device, such as the operating system, sends an initiation message to the server. At stage 504, in response to receiving the initiation message, the server sends a verification code to the client device. The verification code can be sent via any technically feasible data communication channel, including, for example, email, text message, social media update, etc.

At stage 506, the software application on the client device returns the verification code to the server. In response to receiving the returned verification code from the client device, at stage 508, the server delivers a unique ID to the client device that corresponds to the client device. In one embodiment, the server maintains a listing of client devices and the corresponding unique IDs. In some embodiments, the unique ID corresponds to an identity of an individual and not to a particular client device. For example, a person (e.g., "John Doe") may own five different client devices, including a desktop computer, a laptop computer, a mobile phone, a tablet computer, and a video game console. Each of the five client devices is associated with John Doe. The unique ID corresponds to John Doe, such that any time that John Doe communicates with the server 406 using any one of the devices associated with John Doe's identity, the server 406 can recognize that the communication is being received from John Doe.

In some embodiments, the server acts as a certificate authority and the messages transmitted at stages 502, 504, 506, 508 are encrypted. For example, the certificate authority may be associated with a public key and a private key. Messages that are sent to the server from the client device can be encoded by the client device using the certificate authority's public key. In this manner, only the certificate authority can properly decode the messages since only the certificate authority knows the private key.

Figure 6:
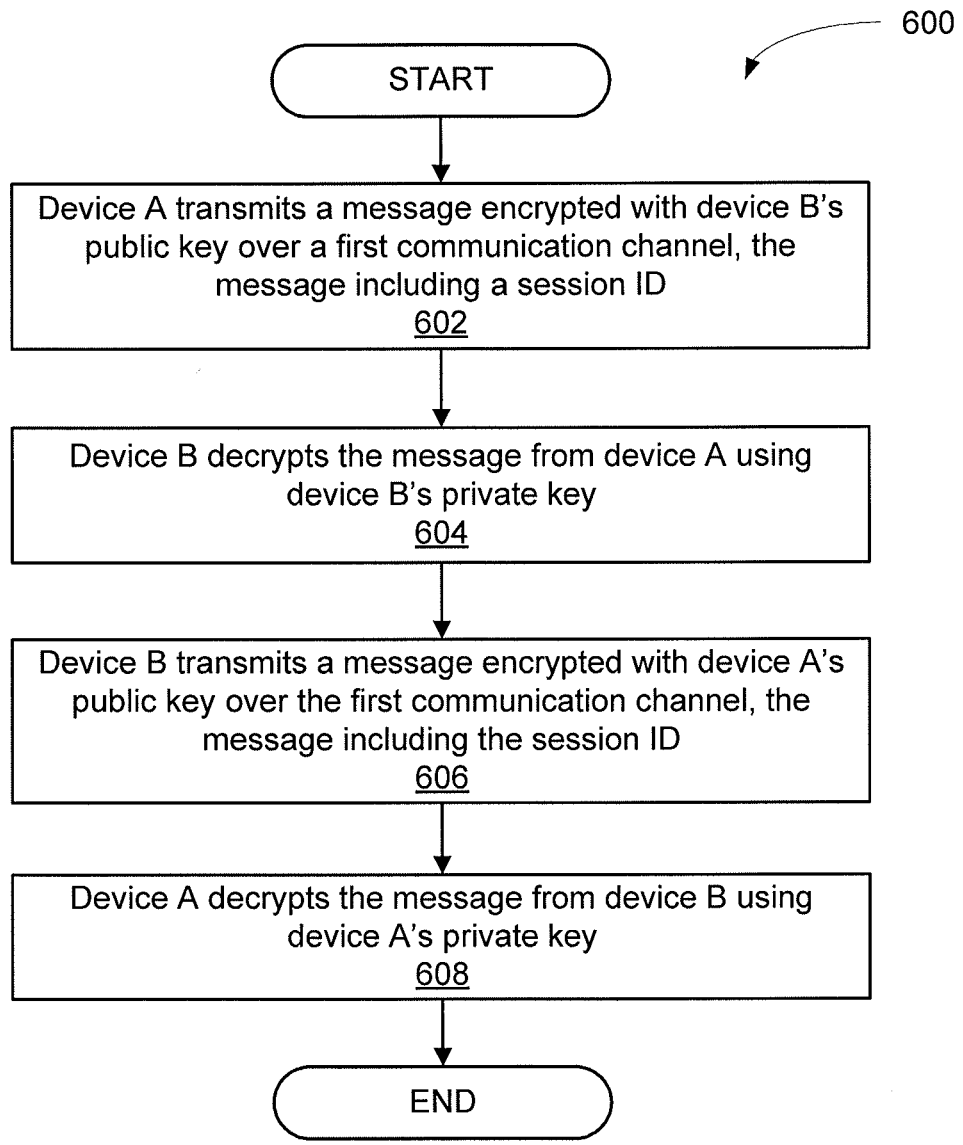
FIG. 6 is a flowchart illustrating establishing a session ID between client devices, according to one embodiment.

FIG. 6 is a flowchart illustrating establishing a session ID between client devices, according to one embodiment. In one embodiment, device A is associated with a public key (i.e., $A_{public}$) and a private key (i.e., $A_{private}$). Similarly, device B is associated with a public key (i.e., $B_{public}$) and a private key (i.e., $B_{private}$).

As shown, at stage 602, a software application executing on device A, such as the operating system, transmits a message encrypted with device B's public key ($B_{public}$) to device B over a first communication channel, such as the audio channel of a telephone call. The message includes a session ID and information about the certificate authority/server that communicates the data associated with the session ID. The session ID may be have been randomly generated by device A at the time of establishing the communication session. In some embodiments, the message includes a timestamp. As described, in one embodiment, the first communication channel comprises an audio channel associated with a telephone call between device A and device B. Also, in some embodiments and as described, the message is encoded as a series of audible or inaudible tones.

In some embodiments, a listener application on device B is configured to listen to the audio stream of the phone conversation via phone audio software (e.g., phone audio software 328). In one embodiment, an API into the phone audio software 328 allows other applications, such as the listener application, to listen to the audio stream of the phone conversation. When the listener application detects a start-of-message code in the audio stream, the listener application begins recording the encoded audio signal that follows the start-of-message code. The listener application stops recording when an end-of-message code is detected. The listener application provides the received encoded audio signal to the encoder/decoder application 326, which is configured to decode the audio signal into another data format. The decoded data format can then be decrypted, as described below.

In another embodiment, the start-of-message and end-of-message codes are not appended to the encoded audio signal. At device B, the listener application detects the audio signal itself and extracts the audio signal from the audio stream of the phone conversation.

At stage 604, a software application executing on device B, such as the operating system, decrypts the message received from device A using device B's private key ($B_{private}$). In this manner, device B is able to ascertain the session ID, the certificate authority/server, and/or the timestamp included in the message from device A.

At stage 606, the software application executing on device B transmits a message encrypted with device A's public key ($A_{public}$) to device A over the first communication channel. The encrypted message at stage 606 includes the session ID. At stage 608, the software application executing on device A decrypts the message received from device B using device A's private key ($A_{private}$). In this manner, device A is now aware that device B successfully received the session ID from device A. Therefore, both device A and device B are now aware of the session ID. Optionally, in some embodiments, additional acknowledgement messages are transmitted between device A and device B to confirm that both devices are properly aware of the session ID.

Figure 7:
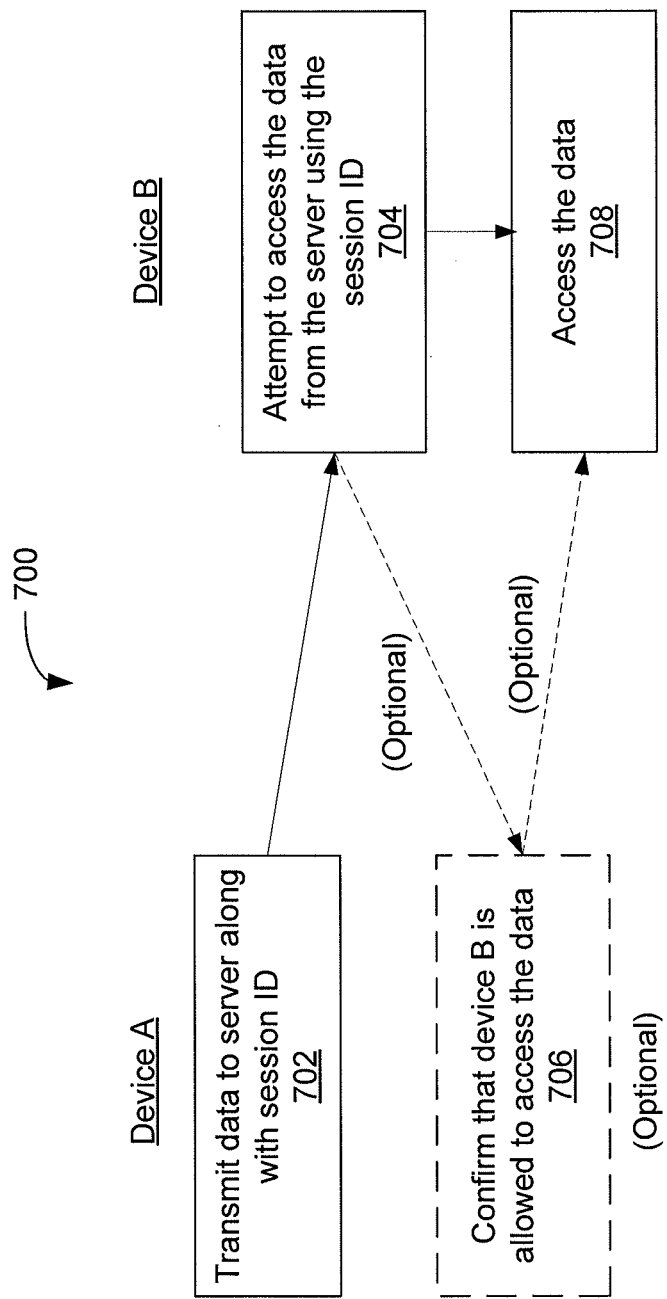
FIG. 7 is a flowchart illustrating communicating data between two client devices using a session ID, according to one embodiment.

FIG. 7 is a flowchart illustrating communicating data between two client devices using a session ID, according to one embodiment. In one embodiment, each of a device A and device B has previously registered with a server/certificate authority, e.g., using the method 500 of FIG. 5. Devices A and B have also established a session ID, e.g., using the method 600 of FIG. 6.

As shown, at stage 702, a software application executing on device A, such as the operating system, transmits data to the server along with the session ID established between device A and device B. In one embodiment, the data transmitted at stage 702 is transmitted over a different communication channel than the communication channel used to establish the session ID. In some embodiments, the software application also transmits device A's unique ID as a form of authenticating device A with the server.

At stage 704, a software application executing on device B, such as the operating system, attempts to access the data from the server using the session ID. The attempt to access the data may be based on a data push from the server to device B or a data pull from device B to the server.

At stage 706, the software application executing on device A confirms that device B is allowed to access the data. In one embodiment, after receiving the access attempt from device B, the server transmits a message to device A asking device A to approve the data access attempt by device B. For example, the server asks for a password of other confirmation code to be entered into device A and communicated to the server. In some embodiments, stage 706 is optional and is omitted, as depicted by the dotted lines around stage 706 and the dotted arrows to and from stage 706.

At stage 708, the software application executing on device B, accesses the data from the server using the session ID. In other embodiments, the method 700 occurs in reverse, with device B transmitting data to the server, the data then being accessed by device A.

In this manner, data is securely communicated between device A and device B via the server. Device A and device B do not necessarily "trust" one another, but they both trust the server, which allows the transaction to be secure.

One example application occurs in a customer service call center environment when a user calls the center. Relevant user information (e.g., name, account number, credit card number, etc.) is stored by the user/mobile phone onto the server or may have been previously stored by the user/mobile phone onto the server. Upon initiation of the telephony connection by the user, a customer service call center agent can access the user information from the server using a session ID for the telephony connection. If the call is transferred to another agent, the other agent is also able to access the user information from the server without requiring the user/mobile phone to re-enter the information.

Figure 8:
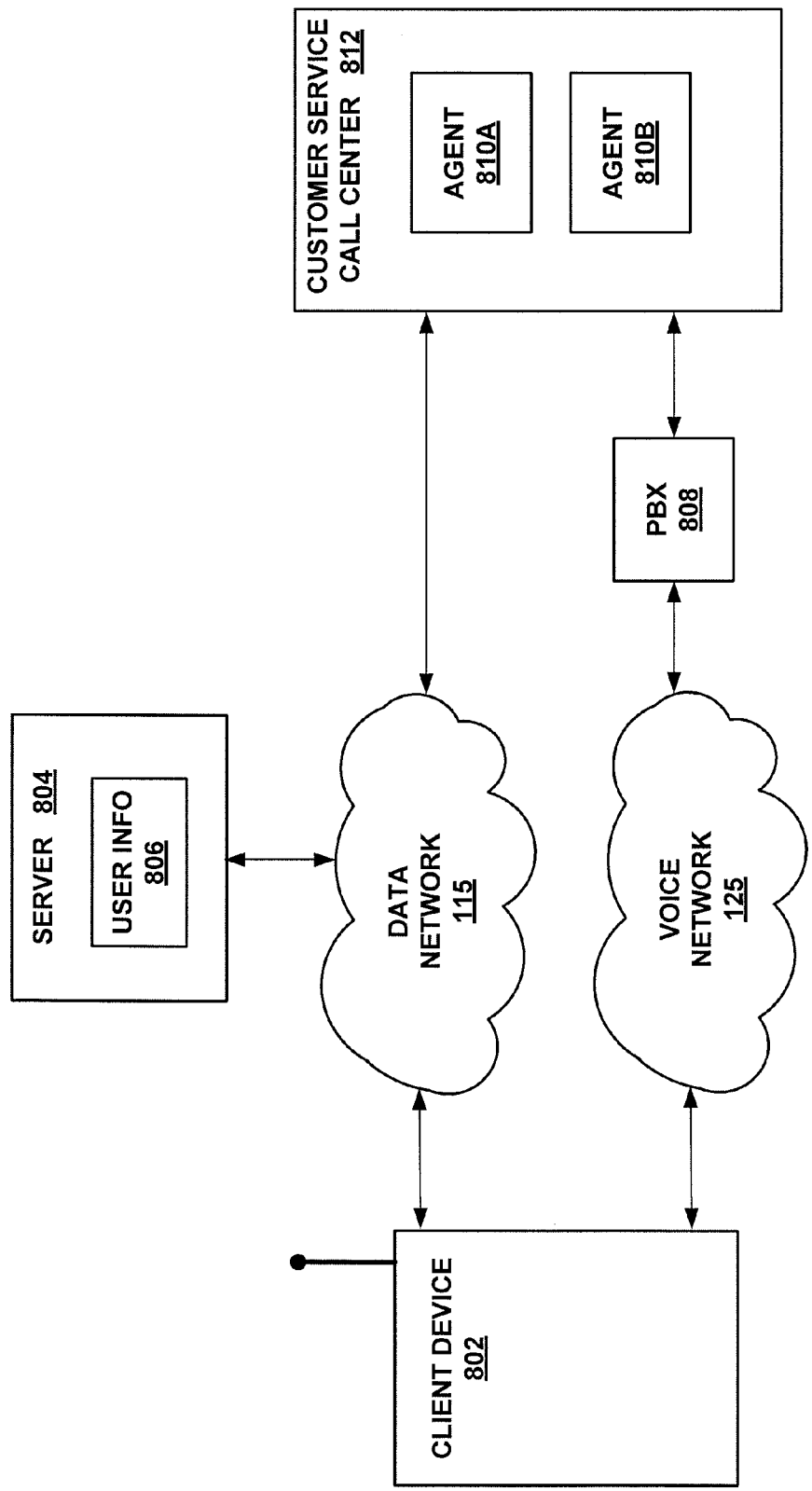
FIG. 8 is a schematic diagram of the arrangement of client device configured to communicate with a customer service call center, according to one embodiment.

FIG. 8 is a schematic diagram of the arrangement of client device 802 configured to communicate with a customer service call center 812, according to one embodiment. As shown, the client device 802 can establish a telephony connection with the customer service call center 812 via a voice network and PBX (private branch exchange). A PBX is oftentimes used by customer service call centers as a telephone exchange between agents 810A, 810B of the customer service call center 812. As described above, the client device 802 and the customer service call center 812 can register with a server 804 via a data network 115.

Relevant user information 806 (e.g., name, account number, credit card number, etc.) is stored by the client device 802 onto the server 804 or may have been previously stored by the client device 802 onto the server 804. Upon initiation of the telephony connection between the client device 802 and the customer service call center 812, a first agent 810A can access the user information 806 from the server 804 via the data network 115 using a session ID for the telephony connection. If the call is transferred to another agent, i.e., agent 810B, then agent 810B accesses the user information from the server 804 in a similar manner to agent 810A, without requiring the user/client device 802 to re-enter the information.

Figure 9:
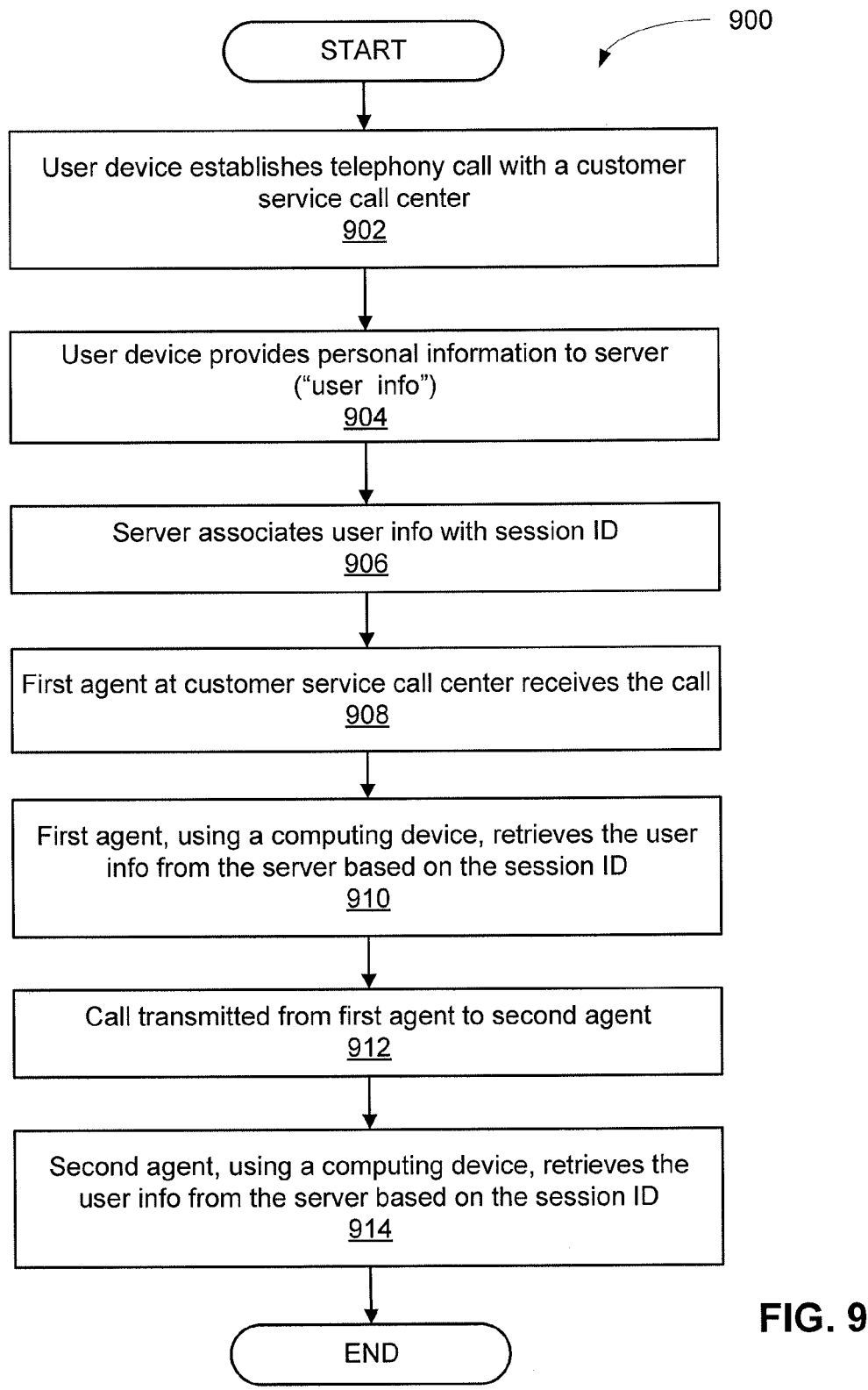
FIG. 9 is a flowchart illustrating a client device communicating with a customer service call center, according to one embodiment.

FIG. 9 is a flowchart illustrating a client device communicating with a customer service call center, according to one embodiment. As shown, the method 900 begins at stage 902 where a user device establishes a telephony call with a customer service call center. As described, both the user device and the customer service call center are registered with a trusted server, and the user device and the customer service call center have established a session ID for the particular telephony connection.

At stage 904, the user device provides personal information about the user to the server ("user info"). In one embodiment, the user information is provided in real-time by the user to the client device which forwards the information to the server. In another embodiment, the user information was previously stored onto the client device and the client device forwards the information to the server. At stage 906, the server associates the user info with the session ID between the user device and the customer service call center.

At stage 908, a first agent of the customer service call center receives the telephony call to service the customer. At stage 910, a computing device used by the first agent retrieves the user information from the server based on the session ID.

At a later time, at stage 912, the telephony call is transferred from the first agent to a second agent. At stage 914, a computing device used by the second agent retrieves the user information from the server based on the session ID. In this manner, both agents are able to retrieve the user information from the server based on knowledge of the session ID. Therefore, the user/client device does not need to repeat the user information each time that the call is transferred to a different agent. Addition, in embodiments where the user information is already stored on the server prior to establishing the telephony call with the customer service call center, the user/client device may not need to provide the user information to any of the agents since the agents are able to retrieve the information from the server using the session ID.

Also, in another example application, the customer service call center provides games to the user while the user is on hold. In one example, the customer service call center transmits the game data to the server that stores the game data. The user accesses the game data via the server. In another example, the user device and the customer service call center both register with a trusted server, but the game data is stored on a third-party server. The customer service call center provides pointers to the game data such that the pointers are stored on the trusted server.

Another example application is a point-of-sale ("POS") terminal. The user establishes a session with the terminal at checkout (e.g., via NFC or other protocol). The user device and the terminal are both communicatively coupled to the server and exchange data via the server. For example, the user provides payment information to the server and the terminal accesses the payment information on the server. Similarly, the server provides a sales receipt to the server that the user then retrieves from the server.

In the example embodiments and applications, the various applications can be configured on any distributed or embedded platform within a single physical location or multiple locations. As such, embodiments contemplate that applications, resources, managers, servers, etc. may be joined or separated without diverging from their identities and functions. For example, a "server device" may equivalently include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Preferred embodiments of this disclosure are described herein, including the best mode known for carrying out the disclosure. Variations of those preferred embodiments may become apparent to those of ordinary skill in the art upon reading the foregoing description. Skilled artisans are expected to employ such variations as appropriate, and the disclosure is expected to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method for exchanging information between endpoints of a telephony connection, the method comprising:
    obtaining, via a communications connection separate from the telephony connection, from a remote server a unique identifier that uniquely identifies a first endpoint;
    communicating, via the communications connection separate from the telephony connection, to the remote server, user information associated with the first endpoint, wherein the user information is associated with the unique identifier;
    establishing a session ID between the endpoints via the telephony connection, wherein the telephony connection is established between the first endpoint and a customer service call center;
    communicating the session ID to the remote server via the communications connection separate from the telephony connection, wherein the user information is communicated from the remote server to a first agent of the customer service call center based on a first agent device providing the session ID to the remote server, and wherein, after the telephony connection is transferred from the first agent to a second agent, the user information is communicated from the remote server to the second agent based on a second agent device providing the session ID to the remote server;
    wherein establishing the session ID between the endpoints comprises:
        transmitting, from the first endpoint via the telephony connection, a first message to the customer service call center, wherein the first message includes the session ID and is encrypted with a public key associated with the customer service call center, and wherein the customer service call center is configured to decrypt the first message using a private key associated with the customer service call center,
        receiving, from the customer service call center via the telephony connection, a second message that includes the session ID encrypted with a public key associated with the first endpoint, and
        decrypting the second message to determine that the customer service call center has successfully received the session ID.

2. The method according to claim 1, wherein the telephony connection comprises an audio channel of a telephone call and the communications connection comprises the Internet.

3. The method according to claim 1, wherein the telephony connection comprises a lower bandwidth connection than the communications connection.

4. The method according to claim 1, wherein the user information comprises at least one of a name, a phone number, a financial card number, a customer account number, and a birth date.

5. The method according to claim 1, further comprising retrieving, from the remote server, other information uploaded by the customer service call center to the remote server.

6. The method according to claim 5, wherein the other information comprises data associated with a game.

7. The method according to claim 1, wherein the first message and the second message are transmitted via the telephony connection as a series of tones.

8. The method according to claim 7, wherein the tones are audible or inaudible.

9. The method according to claim 1, wherein the remote server comprises a certificate authority.

10. A system for exchanging information between devices, the system comprising:
a server coupled to a data network;
a first device coupled to the data network and configured to:
obtain a unique identifier corresponding to the first device from the server via a data connection over the data network,
establish a session ID between the first device and a customer service call center using an audio connection separate from the data network by transmitting a series of tones between the first device and the customer service call center over the audio connection, and
transmit data to the server via the data connection, wherein the server associates the data with the session ID; and
the customer service call center including at least a second device and a third device,
wherein the second device is configured to:
obtain a unique identifier corresponding to the second device from the server via the data connection, wherein the session ID associates the unique identifier corresponding to the first device and the unique identifier corresponding to the second device, and
access the data from the server via the data connection based on the second device providing the session ID to the server; and
wherein, after the audio connection is transferred from the second device to the third device at the customer service call center, the third device is configured to access the data from the server via the data connection based on the third device providing the session ID to the server.

11. The system according to claim 10, wherein the data connection comprises a higher bandwidth connection than the audio connection.

12. The system according to claim 10, wherein the server comprises a certificate authority and the first device comprises a mobile phone.

* * * * *